(12) United States Patent
Sugiyama et al.

(10) Patent No.: US 9,581,738 B2
(45) Date of Patent: Feb. 28, 2017

(54) DISPLAY APPARATUS

(71) Applicant: Tomoegawa Co., Ltd., Tokyo (JP)

(72) Inventors: Masahide Sugiyama, Shizuoka (JP);
Hiroto Katagiri, Shizuoka (JP);
Yusuke Takechi, Shizuoka (JP);
Hiroyuki Abe, Shizuoka (JP)

(73) Assignee: Tomoegawa Co., Ltd., Tokyo (JP)

( * ) Notice: Subject to any disclaimer, the term of this patent is extended or adjusted under 35 U.S.C. 154(b) by 0 days.

(21) Appl. No.: 14/650,481

(22) PCT Filed: Dec. 6, 2013

(86) PCT No.: PCT/JP2013/082766
§ 371 (c)(1),
(2) Date: Jun. 8, 2015

(87) PCT Pub. No.: WO2014/088086
PCT Pub. Date: Jun. 12, 2014

(65) Prior Publication Data
US 2015/0338698 A1    Nov. 26, 2015

(30) Foreign Application Priority Data

Dec. 7, 2012  (JP) ................................ 2012-268784

(51) Int. Cl.
| | | |
|---|---|---|
| G02F 1/133 | (2006.01) | |
| G02B 5/02 | (2006.01) | |
| G02F 1/1335 | (2006.01) | |

(52) U.S. Cl.
CPC ......... *G02B 5/0263* (2013.01); *G02B 5/0242* (2013.01); *G02B 5/0257* (2013.01); *G02B 5/0278* (2013.01); *G02F 1/133504* (2013.01); *G02F 1/133528* (2013.01); *G02F 1/133606* (2013.01); *G02F 2001/133507* (2013.01); *G02F 2202/023* (2013.01)

(58) Field of Classification Search
CPC .................................................. G02F 1/133606
See application file for complete search history.

(56) References Cited

U.S. PATENT DOCUMENTS

| | | | |
|---|---|---|---|
| 4,929,523 | A | 5/1990 | Kitayama et al. |
| 2005/0001957 | A1 | 1/2005 | Amimori et al. |

(Continued)

FOREIGN PATENT DOCUMENTS

| | | |
|---|---|---|
| JP | 2547417 | 8/1996 |
| JP | 2004-341309 | 12/2004 |

(Continued)

*Primary Examiner* — Phu Vu
(74) *Attorney, Agent, or Firm* — Norris McLaughlin & Marcus, P.A.

(57) ABSTRACT

Provided is a display apparatus which has a sufficient luminance even when viewed at a large viewing angle, and which can overcome a problem of color change. The display apparatus is a display apparatus including a display device showing a color change in accordance with viewer's viewing angle, and an anisotropic optical film having a diffusing property changed in accordance with the incident angle of light radiated thereinto. The anisotropic optical film has at least one scattering central axis, and an angle made between the scattering central axis and a direction along which the display device shows a minimum color change is from 20 to 65°, or −20 to −65°.

10 Claims, 4 Drawing Sheets

(56) References Cited

U.S. PATENT DOCUMENTS

2007/0011097 A1    1/2007  Eckleder
2007/0110957 A1    5/2007  Higashi et al.
2007/0195233 A1*   8/2007  Hasegawa ......... G02F 1/133504
                                                        349/112
2012/0250158 A1   10/2012  Tamaki et al.

FOREIGN PATENT DOCUMENTS

| JP | 2005-265915 | 9/2005 |
| JP | 2007-79855  | 3/2007 |
| JP | 2007-249182 | 9/2007 |
| JP | 2012-155068 | 8/2012 |
| JP | 2012-208408 | 10/2012 |
| JP | 2012-226158 | 11/2012 |

* cited by examiner

DISPLAY APPARATUS

TECHNICAL FIELD

The present invention relates to a display apparatus in which luminance and color change in accordance with viewer's viewing angle can be improved or solved.

BACKGROUND ART

About almost all of display apparatuses, the displaying performance thereof is changed in accordance with viewer's viewing angle. A typical example of the apparatuses is a liquid crystal display apparatus, a typical mode of which is a twisted nematic (TN) mode.

The wording "being changed in accordance with viewer's viewing angle" means that between the case of observing a display apparatus from the front surface direction (in the direction of a normal line (normal direction) of an observing surface of the display apparatus, i.e., a direction of a viewing angle of 0°) and the case of observing the display apparatus from an oblique direction (in a direction of a viewing angle more than or less than 0°), a difference is generated in displaying performances such as contrast ratio, gradation property, and chromaticity. It is known that these displaying performances are generally poorer when the display apparatus is observed in the oblique direction than when observed from the front surface direction.

Display apparatuses are required to have various displaying performances, for example, such a performance that the viewing angle is enlarged while the apparatuses maintain a bright display, and such a performance that the apparatuses are decreased in color change with the enlargement in the viewing angle.

The wording "viewing angle" denotes the following angle when the front surface direction of a display apparatus (normal direction of an observing surface of the display apparatus, or a direction of a viewing angle of 0°) is regarded as 0°: an angle, within a range of −90 to 0° and one of 0 to +90°, at which an viewer or observer views the display apparatus. The reason why the value of the viewing angle may be minus is that when any value in one of the ranges is regarded merely as a plus value, any value in the other is regarded as a minus value. Thus, the reason is a convenient reason. As the absolute value of this viewing angle increases, the display apparatus is generally decreased in luminance. In a flat panel display (FPD) such as a liquid crystal display apparatus, for a structural reason thereof, as well as for a nature that light diffuses more easily as the wavelength thereof is made shorter, a problem remains that when the absolute value of the viewing angle is increased, the resultant image is disturbed in balance between colors to be more easily changed in color.

However, in conventional techniques, neither an effect against the problem that the luminance is lowered as the absolute value of the viewing angle is increased, nor an effect of decreasing the color change with an increase in the absolute value of the viewing angle is sufficient.

In one of the conventional techniques, it is conceived that a member having an isotropic light-diffusing property (for example, see Patent Literature 1) is used in a display apparatus. A mechanism that this light diffusion member expresses light diffusion is classified into light scattering based on irregularities formed in a surface (light surface scattering), light scattering based on a difference in refractive index between a matrix resin and fine particles dispersed therein (light internal scattering), and light scattering based on both of light surface scattering and light internal scattering.

However, the light diffusion film described in Patent Literature 1 is used in a plane light source; thus, when this film is used for an observing surface of a display apparatus, viewer's viewing angle is somewhat enlarged, but it is very difficult that the display apparatus is increased in viewing angle absolute value while maintaining a bright display. Thus, a difficult problem remains in order to decrease a color change with the increase in the viewing angle absolute value. Moreover, the above-mentioned light diffusion member is merely a member having a property of isotropic diffusion, and has a problem that a blurred image is easily generated.

Figure 6:
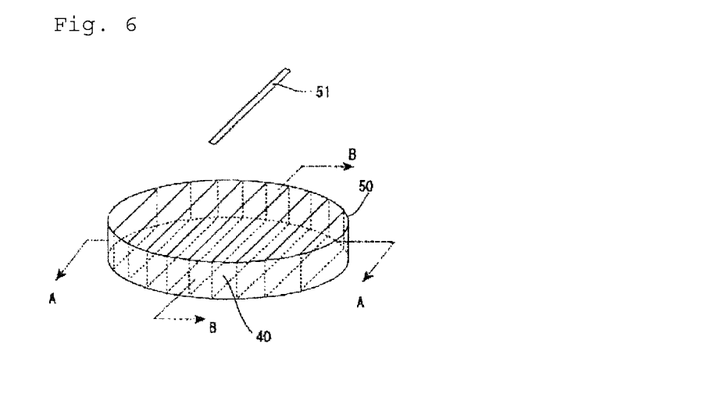
FIG. 6 is a schematic view of a light control plate.
Figure 7:
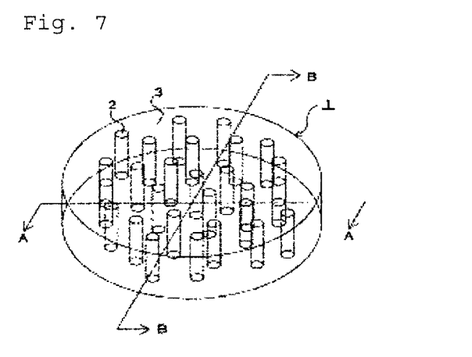
FIG. 7 is a schematic view of an anisotropic diffusion medium.

In the meantime, as a member different in optical property from the light diffusion member, known is a light control plate or an anisotropic diffusion medium, which intensely diffuses incident light having an angle in a predetermined angle range but transmits incident light having an angle out of the range. As illustrated in FIG. 6, the light control plate has therein tabular structures (for example, Patent Literature 1). As illustrated in FIG. 7, the anisotropic diffusion medium has therein columnar structures (for example, Patent Literature 2).

Figure 8:
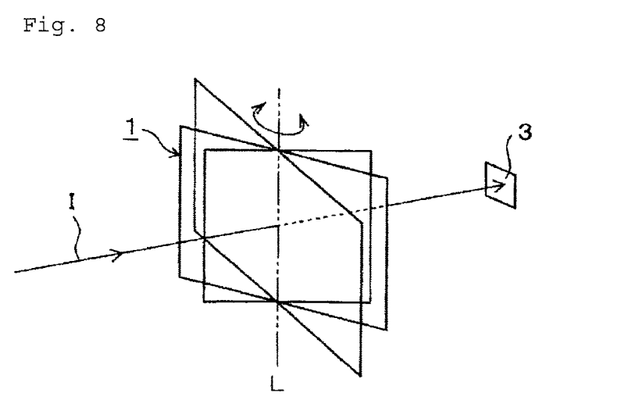
FIG. 8 is a view illustrating a method for measuring an optical profile.

It can be checked by a method illustrated in FIG. 8 that such a member is varied in diffusing property (indicates anisotropy) in accordance with the incident angle (of light thereto). As illustrated in FIG. 8, a sample is arranged between a light source not illustrated, and a light receiving unit 3. While the angle of the sample is varied around a central axis that is a straight line L on the surface of the sample, light is straightly transmitted through the sample. The linear transmittance of the light radiated into the light receiving unit 3 is measurable.

Figure 9:
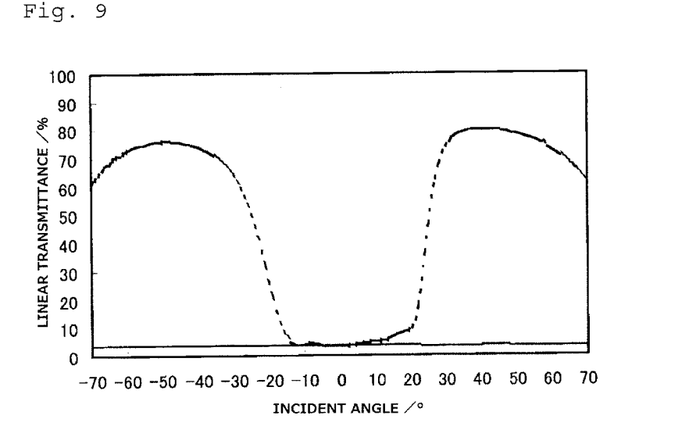
FIG. 9 shows an optical profile of a light control plate.

FIG. 9 shows the incident angle dependency of the scattering property that the light control plate 50 illustrated in FIG. 6 has, the dependency being measured using the method illustrated in FIG. 8. Its vertical axis represents the linear transmittance (of the film) (i.e., at the time that parallel rays having a predetermined light quantity are incident, light quantity of emitted-out parallel rays in a direction identical with the incident direction), the linear transmittance being an index showing the degree of scattering (on the sample). Its horizontal axis represents the incident angle of the rays. In FIG. 9, a solid line and a broken line show cases of rotating the light control plate 50, respectively, around the center of an axis A-A (penetrating the tabular structures) and around the center of an axis B-B (parallel with the tabular structures) in FIG. 6. It is understood that by changing the axis of the light control plate 50, the plate 50 is changed in properties, as illustrated in FIG. 9.

Figure 10:
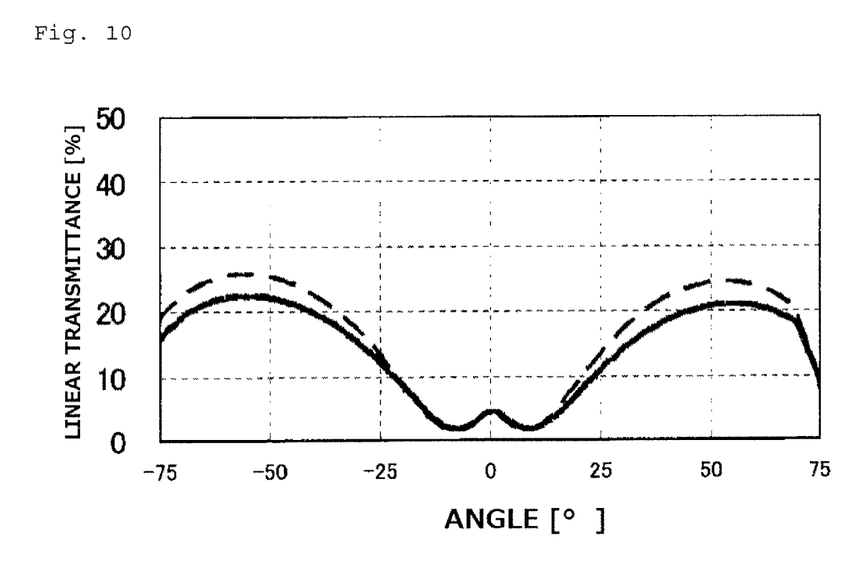
FIG. 10 shows an optical profile of an anisotropic diffusion medium.

FIG. 10 shows the incident angle dependency of the scattering property that the anisotropic diffusion medium illustrated in FIG. 7 has, the dependency being measured using the method illustrated in FIG. 8. It is understood that even when changing the axis of the anisotropic diffusion medium, the properties of the medium 1 are not changed very much, as illustrated in FIG. 10.

CITATION LIST

Patent Literatures

Patent Literature 1: JP 2547417 B2
Patent Literature 2: JP 2005-265915 A

SUMMARY OF INVENTION

Technical Problem

In light of the above-mentioned problems, an object of the present invention is to provide a display apparatus which has a sufficient luminance even when viewed at a large viewing angle, and which can overcome the problem of the color change.

Solution to Problem

In the case of using, in display apparatuses, a light control plate and an anisotropic diffusion medium as described above, respectively, (hereinafter members including both of a light control plate and an anisotropic diffusion medium will be called "anisotropic optical films"), the plate and the medium are used as a film having diffusing property and a film having a light condensing property, respectively.

The inventors have made eager investigations, so that the problems can be solved by producing structures formed in an anisotropic optical film to be inclined to a predetermined angle, and combining this product with a predetermined display device.

The present invention can solve the problems by the following technical subject matters:
(1) A display apparatus comprising a display device showing a color change in accordance with viewer's viewing angle, and an anisotropic optical film having a diffusing property changed in accordance with the incident angle of light radiated thereinto, wherein the anisotropic optical film has at least one scattering central axis, and an angle made between the scattering central axis and a direction along which the display device shows a minimum color change is from 20 to 65°, or −20 to −65°.
(2) A display apparatus comprising a display device showing a color change in accordance with viewer's viewing angle, and an anisotropic optical film having a diffusing property changed in accordance with the incident angle of light radiated thereinto, wherein the anisotropic optical film has at least two scattering central axes, an angle made between one of the scattering central axes and a direction along which the display device shows a minimum color change is from 20 to 65°, and an angle made between the other scattering central axis and the direction along which the display device shows the minimum color change is from −20 to −65°.
(3) The display apparatus according to item (1) or (2), wherein an angle made between the scattering central axis or each of the scattering central axes and the normal direction of an observing surface of the display device ranges from −60 to 60°.
(4) The display apparatus according to item (1) or (2), wherein the anisotropic optical film has a tabular region.
(5) The display apparatus according to item (1), wherein the display device is a liquid crystal device, a plasma display panel, or an organic EL device.
(6) The display apparatus as recited in item (5), wherein the liquid crystal display device has: a liquid crystal cell in which a liquid crystal is sandwiched between a pair of substrates; and a polarizer.

Advantageous Effects of Invention

According to the present invention, a display apparatus can be provided which has a sufficient luminance even when viewed at a large viewing angle, and which can solve the problem of the color change.

DESCRIPTION OF EMBODIMENTS

Herein, a description is made about the definition of each term in the present claims and the present specification.

The terms "low-refractive-index region" and "high-refractive-index region" are regions of an anisotropic optical film that are formed by a local level difference of the refractive index of a material constituting this film, and the terms relatively show whether one of the regions is higher or lower in refractive index than the other. These regions are formed when the material constituting the anisotropic optical film is cured.

The term "scattering central axis" (of a film or an anisotropic optical film) means the following when the incident angle of light (to the film) is varied: a direction consistent with a varied incident angle value (of the light) about which the scattering property of the film has substantial symmetries with each other. The reason why the "film has substantial symmetries with each other" is that the film does not strictly have symmetric property of an optical property. The scattering central axis is found out by observing the inclination of a cross section of the film through an optical microscope, or observing the projected shape of the light through the anisotropic optical film while the incident angle is varied.

The linear transmittance of an anisotropic optical film is concerned with the linear transparency of light radiated into the film. When the light is radiated thereinto at an incident angle, the linear transmittance is the ratio between the transmitted light quantity in the straight line direction, and the light quantity of the incident (or radiated-into) light, and is represented by the following expression:

Linear transmittance (%)=("linear transmitted light quantity"/"incident light quantity")×100

The terms "short wavelength" and "long wavelength" are used with meanings relative to each other, and each does not denote any specified wavelength range.

Hereinafter, the contents of the present invention will be described.

Figure 1:
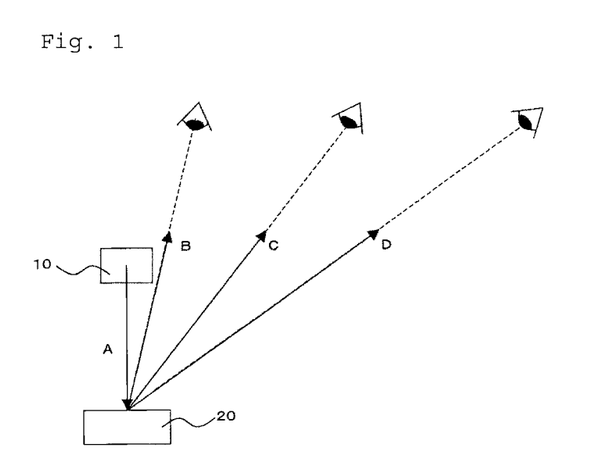
FIG. 1 is a view referred to for describing a mechanism that a color changed in accordance with viewer's viewing angle is generated.

With reference to FIG. 1, a description is initially made about a mechanism (estimated) that in a display apparatus, a color change is generated in accordance with viewer's viewing angle. FIG. 1 is a view illustrating a matter that an emitted-out ray A from a light source 10 is reflected on the front surface of a medium 20 to give reflected rays B, C and D. The emitted-out ray A is a ray having plural wavelengths in the visible ray range. The scattering and reflection of light are varied in accordance with the wavelength(s) of the light. Light has a nature that as the wavelength thereof is shorter, the light diffuses more easily, and as the wavelength is longer, the light diffuses less easily. When the reflected ray B is judged to be good in balance between individual wavelengths, the reflected ray C is more largely disturbed in light ray balance than the reflected ray B (short-wavelength components of the ray are large in quantity while long-wavelength components thereof are small therein). Similarly, the reflected ray D is more largely disturbed in light ray balance than the reflected ray C (short-wavelength components of the ray are large in quantity while long-wavelength components thereof are small therein). It can be considered that when the light ray balance is disturbed in this way, there is caused a problem of color change in accordance with the viewing angle (hereinafter referred to also merely as "color change"). As a result, observers who are present on lines extended from the reflected rays B, C and D), respectively, recognize colors different from each other. In the case of regarding, in FIG. 1, the viewing angle in the normal direction as zero degree, the viewing angle along the reflected ray B is a minimum angle while that along the reflected ray D is a maximum angle.

FIG. 1 has shown that reflected rays are disturbed in light ray balance. However, such a phenomenon is not a phenomenon restricted to any reflected ray. An equivalent phenomenon can be observed about diffused rays (scattered rays). Accordingly, not only in a reflective display apparatus, but also in a transmissible display apparatus or semi-transmissible and semi-reflective display apparatus, the same problem that the light ray balance is disturbed is caused. The light ray balance comes to be more easily disturbed as light reflection or scattering is more largely generated; thus, the order that the light ray balance is more easily disturbed is the order of reflective, semi-transmissible and semi-reflective and transmissible display apparatuses.

Figure 2:
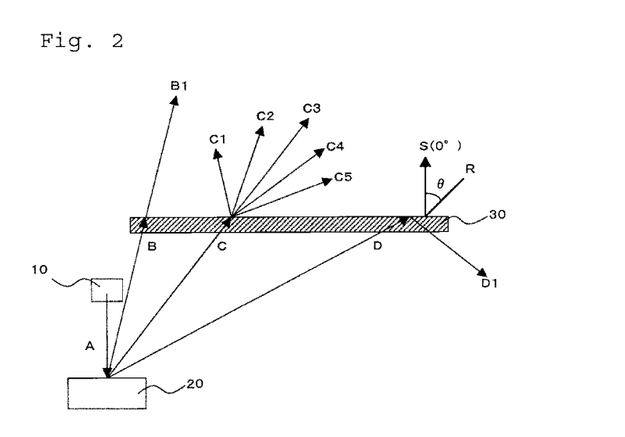
FIG. 2 is a view illustrating an example of a matter that a color changed in accordance with viewer's viewing angle is improved by passing light through an anisotropic optical film.

By passing light in which a color change is generated through an anisotropic optical film, the light can be conversed to light good in ray balance, in which a color change is little in quantity. Referring to FIG. 2, this matter is herein described. A reflected ray B passes through an anisotropic optical film 30, so that a transmitted ray B1 small in diffused light quantity is obtained. The reflected ray B gives not only the transmitted ray B1, but also a little scattered ray, which is not illustrated.

In FIG. 2, a reflected ray C passes through the anisotropic optical film 30 to be converted to diffused rays C1 to C5. The diffused ray C1 is substantially equal in balance to that C5. The diffused ray C2 is substantially equal in balance to that C4. The diffused ray C3 is small in short-wavelength light quantity but large in long-wavelength light quantity. The diffused rays C2 and C4 are larger in short-wavelength light quantity but smaller in long-wavelength light quantity than the diffused ray C3. Similarly, the diffused rays C1 and C5 are larger in short-wavelength light quantity but smaller in long-wavelength light quantity than the diffused rays C2 and C4. Accordingly, the reflected rays B and C are different from each other in properties of light passing through the anisotropic optical film 30. This difference is based on a contribution of the inclination of structures (columnar structures, tabular structures, or the two) inside the anisotropic optical film 30 to the diffusing property of light. A reflected ray D is emitted out at an angle more than a predetermined emission angle to be totally reflected on a surface of the anisotropic optical film to be converted to a reflected ray D1.

In the present invention, light radiated from a predetermined incident angle into the anisotropic optical film 30 is selectively diffused to make it possible to supply light into a viewing angle field in which a luminance shortage or a color change is easily generated. In this way, the present invention can attain a total optimization of light ray balance.

When the normal direction S of the anisotropic optical film 30 is regarded as zero degree in FIG. 2, the slope angle $\theta$ of the inclination R of the structures (the columnar structures, the tabular structures, or the two structure species) in the anisotropic optical film 30 is set into a range preferably from 0 to 60 degrees, or 0 to −60 degrees, more preferably from 20 to 50 degrees, or −20 to −50 degrees. If the inclination $\theta$ is too small or too large, the color-change improving effect is not easily produced.

The present invention makes use of a display device showing a color change in accordance with viewer's viewing angle. The display device is not particularly limited as far as the device is a device for attaining displaying. Examples thereof include a liquid crystal display device, a plasma display panel, and an organic EL device. The liquid crystal display device has a liquid crystal cell sandwiched between a pair of substrates, and a polarizer. The form of the liquid crystal cell is not particularly limited, and is, for example, a form having a liquid crystal sandwiched between a thin film transistor array substrate and a color filter substrate. The form of the polarizing plate is not particularly limited, and is, for example, a form containing, from the liquid crystal cell side of the device, a polarizer and a supporting film in this order, a form containing, from the liquid crystal cell side, a supporting film and a polarizer in this order, or a form containing, from the liquid crystal cell, a first supporting film, a polarizer, and a second supporting film in this order. The supporting film may be the same transparent substrate as an anisotropic optical film has. Polarizing plates as described as above are usually arranged, respectively, on both of the observing surface side and the rear surface side of the liquid crystal cell. However, such a polarizing plate may be arranged only on the observing surface side or on the rear surface side. It is preferred that the polarizing plate(s) preferably (each) further contain(s) a retardation film. This manner makes it possible to improve the liquid crystal display device further in viewing angle dependency of chromaticity or some other property.

A color change in accordance with viewer's viewing angle is a display performance of a display device. Specifically, a measurement is made about each of the luminance (L*) and the color number (a*, b*) of the display device in each of a direction in which a minimum color change is exhibited in the display device, and a direction different from the direction mentioned just above by an angle of 60 degree or −60 degrees (it is sufficient for the angle at which the measurement is made to be either one). Thereafter, the value $\Delta E^*ab$ (color difference) can be calculated out. Specifically, the color change can be calculated out in accordance with an expression described below. When the direction in which the minimum color change is exhibited in the display device is regarded as zero degree about the expression, ΔL*, Δa*, and Δb* are calculated.

$$\Delta E^*ab = [(\Delta L^*)^2 + (\Delta a^*)^2 + (\Delta b^*)^2]^{1/2}$$

wherein $\Delta L^* = L^*(60°) - L^*(0°)$ $\Delta a^* = a^*(60°) - a^*(0°)$ and $\Delta b^* = b^*(60°) - b^*(0°)$.

As the value ΔE*ab is lower, the color change in accordance with the viewing angle is smaller in quantity. The value ΔE*ab is preferably 60 or less, more preferably 50 or less, even more preferably 45 or less. As the lower limit value thereof is lower, a more preferred result is obtained from the viewpoint of the color change. However, if the lower limit value is too low, a problem is caused that the display apparatus becomes high in haze so that a blurred image is liable to be displayed, or that the apparatus is liable to be lowered in front direction luminance. Thus, the value ΔE*ab is preferably 10 or more, more preferably 20 or more.

In the display apparatus of the present invention, a more preferred result is obtained as the value L*(0°) in the normal direction is higher. The value L*(0°) is largely varied in accordance with the kind of the display device.

A more preferred result is obtained as a difference is lower which is obtained by subtracting the value L*(0°) in the normal direction from the value L*(60°) obtained when the viewing angle is inclined at 60° from the normal direction of the observing surface of the display apparatus, or by subtracting the value L*(0°) in the normal direction from the value L*(-60°) obtained when the viewing angle is inclined at -60 degrees from the normal direction. As the value ΔL* is made lower, the difference in luminance becomes smaller between the normal direction and the 60° or -60° direction. Thus, even when the viewing angle is changed, an image that gives less unnatural feeling can be obtained. The difference obtained by subtracting the normal direction value L*(0°) from the value L*(60°) is varied in accordance with the kind of the display device.

The color change in accordance with the viewing angle means that when an image of the display apparatus is observed from the front surface direction (normal direction of the observing surface direction of the display apparatus, or a direction of a viewing angle of 0°), and from an oblique direction (a direction of a viewing angle more than 0°), the observed images are different from each other in color phase. Usually, the color phase of the display device is larger as the observing direction is nearer to the front surface direction. However, the color phase may be reverse thereto.

Figure 3:
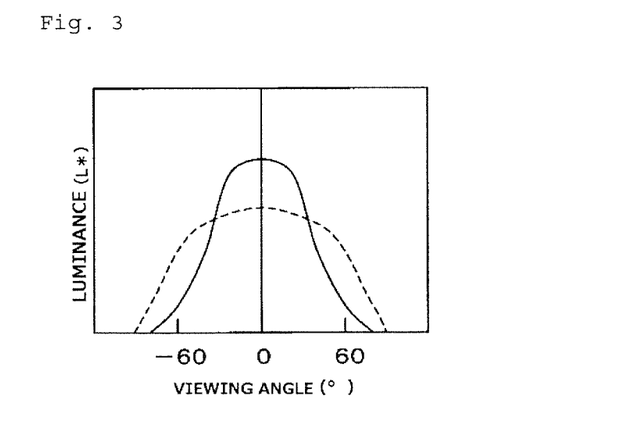
FIG. 3 shows an example of a matter that the luminance of a display apparatus is varied in accordance with viewer's viewing angle.

FIG. 3 shows an example of a matter that the luminance of a display apparatus is varied in accordance with viewer's viewing angle. The luminance of the display apparatus is a collection having various wavelengths in accordance with a light source therefor. The wavelengths are divided into short wavelengths and long wavelengths for convenience. As the wavelengths are shorter, the lights diffuse more easily. As the wavelengths are longer, the lights diffuse less easily. The luminance at 60° is larger as the wavelengths are shorter, and is smaller as the wavelengths are longer. In FIG. 3, the short wavelengths and the long wavelengths are shown as a collection of these wavelengths without being distinguished from each other.

In FIG. 3, a normal distribution the center of which is 0° is shown. A solid line in FIG. 3 is a line of a conventional technique. At larger viewing angles (of -60 to 60°), the luminance is small.

A broken line in FIG. 3 is drawn about a display apparatus of the present invention. By assigning a part of the luminance in the front surface direction (0°) to the luminance at larger viewing angles in the invention, a display apparatus can be provided which has a sufficient luminance even at a large viewing angle. The invention also makes it possible to decrease the color change in accordance with the viewing angle.

FIG. 3 has shown an example of a display apparatus showing a normal distribution having a center of 0°. However, the display apparatus of the present invention is not limited to this display apparatus. The present invention is applicable to, for example, a display apparatus showing a normal distribution having a center of 30°, or a display apparatus showing a substantial symmetry having a center of -30°.

Figure 4:
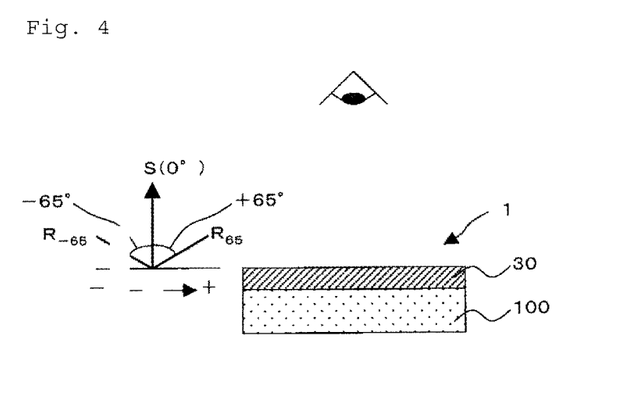
FIG. 4 shows an example illustrating a display apparatus of the present invention.

FIG. 4 illustrates a display apparatus 1 having a display device 100 showing a color change in accordance with viewer's viewing angle, and an anisotropic optical film 30 changed in diffusing property in accordance with the incident angle of light radiated thereinto. The anisotropic optical film 30 is preferably located on the observing surface side of the display device 100. In FIG. 4, the anisotropic optical film 30 has a single scattering central axis. When the normal direction S thereof is regarded as 0°, the direction in which a minimum color change in the display device 100 is exhibited is determinable at will in a range larger than -90° and less than +90°. The direction is preferably a range from -30 to +300 both inclusive, more preferably from -15 to +15° both inclusive for the following reason: the display apparatus has a display performance having a substantial symmetry; thus, if the display apparatus has an extreme direction as the direction in which a minimum color change is exhibited, the display apparatus does not function in the other directions.

An angle made between the scattering central axis of the anisotropic optical film 30 and the direction in which a minimum color change is exhibited in the display device 100 needs to range from 20 to 65°, or -20 to -65°, preferably from 30 to 55°, or -30 to -55°. By setting the angle into the range, light in the direction in which the minimum color change in the display device 100 is exhibited can be assigned to light at larger viewing angles. This manner makes it possible to provide a display apparatus which has a sufficient luminance even at a large viewing angle. Moreover, the present invention makes it possible to decrease the color change in accordance with the viewing angle.

It is sufficient for the anisotropic optical film 30 to have therein a single scattering central axis. The film 30 may have two or more scattering central axes. Anisotropic optical films having scattering central axes different from each other may be laminated onto each other. When a single anisotropic optical film has therein two or more scattering central axes, or two anisotropic optical films having different scattering central axes are laminated onto each other, it is preferred that an angle between one of the scattering central axes and the direction in which a minimum color change in the display device is exhibited ranges from 20 to 65° while an angle between the other scattering central axe and the direction in which the minimum color change in the display device is exhibited ranges from -20 to -65°. More preferably, the former angle ranges from 30 to 55°, and the latter angle ranges from -30 to -55°. When the two angles are set to the preferred respective ranges, the display apparatus can gain substantially symmetric optical properties.

The anisotropic optical film is classified to both of a film having therein tabular structures, and a film having therein columnar structures. These structure species may be simultaneously incorporated into an anisotropic optical film.

When the anisotropic optical film having tabular structures is compared with that having columnar structures in color change improving effect obtained, the former can be more greatly improved in color change improving effect by the tabular structures inside the anisotropic optical film but may be abruptly changed in improvement in the color change in accordance with the viewing angle. Thus, an unnatural impression may be given to the observer. In the meantime, the latter is slightly less poorly improved in color change improving effect by the columnar structures inside the anisotropic optical film but is gently changed in effect of improvement in the color change in accordance with the viewing angle. Thus, an unnatural impression is scarcely given to the observer. Additionally, when both of tabular structures and columnar structures are incorporated into an anisotropic optical film, the film has a nature between these natures.

It is preferred to adjust the internal structure of the anisotropic optical film appropriately in accordance with a purpose of the use thereof.

Figures 5A, 5B:
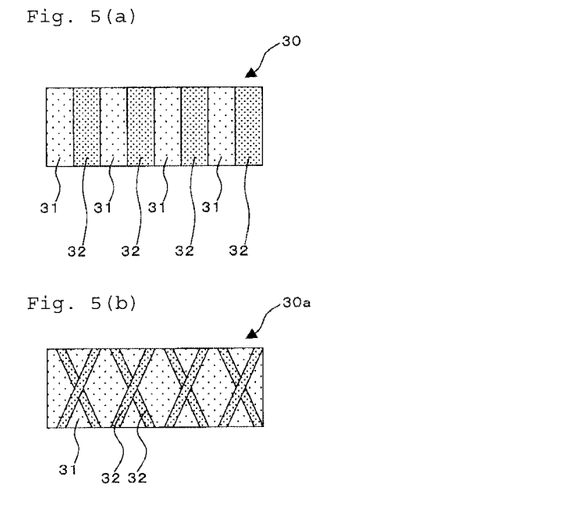
FIGS. 5(a) and 5(b) are each a sectional view of an anisotropic optical film.

FIGS. 5(a) and 5(b) are each a schematic view of an anisotropic optical film 30 of the present invention. As illustrated in FIG. 5(a), the anisotropic optical film 30 alternately includes, in a cross section thereof, low-refractive-index regions 31 and high-refractive-index regions 32. As illustrated in FIG. 5(b), high-refractive-index regions 32 adjacent to each other may be caused to cross each other. When the adjacent high-refractive-index regions 32 may be caused to cross each other, the crossing may wholly or partially attained in the anisotropic optical film 30a. The crossing makes it possible to improve color changes at viewing angles corresponding to two directions reverse to each other.

In FIG. 5(b), instead of the high-refractive-index regions, the low-refractive-index regions may be caused to cross each other, or may be varied from each other in inclination.

The refractive index difference (absolute value) between the low-refractive-index regions and high-refractive-index regions is preferably 0.02 or more, more preferably 0.03 or more, even more preferably 0.04 or more. As the refractive index difference is larger, the anisotropic optical film is larger in anisotropic degree.

In FIGS. 5(a) and 5(b), individual interfaces between the low-refractive-index regions 31 and the high-refractive-index regions 32 are each drawn as a straight line. However, the interfaces may be each in a substantially linear form or a curved form. Even the substantially linear or curved interfaces cause the anisotropic optical film to exhibit an incident angle dependency as shown in FIG. 9 or 10.

In FIGS. 5(a) and 5(b), the interfaces between the low-refractive-index regions 31 and the high-refractive-index regions 32 have been drawn. However, the interfaces may be not substantially present.

When the anisotropic optical film is gradually increased or decreased in refractive index, the refractive index is not easily measured. However, when plural local refractive indexes of the anisotropic optical film are measured, the refractive index difference between the lowest refractive index moiety and the highest refractive index moiety is 0.02 or more, more preferably 0.03 or more, even more preferably 0.04 or more. As the refractive index is larger, the film is larger in anisotropic degree.

Method for Producing Anisotropic Optical Film

The anisotropic optical film of the present invention can be produced by radiating ultraviolet (UV) rays to a specific photocurable compound layer under especial conditions. Hereinafter, the raw material of the anisotropic optical film will be firstly described and a process for the production will be secondly described.

Raw Material of Anisotropic Optical Film

The raw material for forming the anisotropic optical film of the present invention is a material which is composed of at least a photoinitiator, and a monomer, oligomer, prepolymer, polymer or macromonomer of a photocurable compound, and which is polymerized and solidified by irradiation with ultraviolet rays and/or visible lights. It is preferred to use, besides the photocurable compound, a resin different therefrom in curing manner, or the above-mentioned photocurable compound. The resin different in curing manner may be a thermoplastic resin or a thermoset resin. It is allowable to adopt appropriately a combination of the photocurable compound with the thermoplastic resin, of the photocurable compound with the thermoset compound, or of the photocurable compound, the thermoplastic resin, and the thermoset resin.

Even when the material for forming the anisotropic optical film is of a single species, a refractive index difference is generated therein by a matter that a level difference in density is generated therein for the following reason: a portion thereof where the irradiation intensity of the UV is large has a large curing speed; thus, the curable material shifts in the vicinity of the cured region, so that a region high in refractive index and a region low in refractive index are formed.

(Photocurable Compound)

The photocurable compound is a monomer, oligomer, prepolymer or macromonomer having one or more radical polymerizable or cation polymerizable functional groups. Examples of the radical polymerizable functional group(s) include acryloyl, methacryloyl, and allyl groups. Examples of the cation polymerizable functional group(s) include epoxy and oxetane groups. The kind and the number of the functional group(s) of the compound are not particularly limited. As the number of the functional group(s) is larger, the resultant polymer is raised in crosslinkage density so that the refractive index difference is favorably generated with ease. The photocurable compound preferably has a polyfunctional acryloyl or methacryloyl group.

The radical polymerizable compound is mainly a compound having, in the molecule thereof, one or more unsaturated double bonds. Specific examples thereof include acrylic oligomers called through respective names of methyl acrylate, epoxy acrylate, urethane acrylate, polyester acrylate, polyether acrylate, and polybutadiene acrylate; and acrylate monomers such as 2-ethylhexyl acrylate, isoamyl acrylate, butoxyethyl acrylate, ethoxydiethylene glycol acrylate, phenoxyethyl acrylate, tetrahydrofurfuryl acrylate, isonorbornyl acrylate, 2-hydroxyethyl acrylate, 2-hydroxypropyl acrylate, 2-acryloyloxy phthalate, dicyclopentenyl acrylate, triethylene glycol diacrylate, neopentyl glycol diacrylate, 1,6-hexanediol diacrylate, an EO adduct diacrylate of bisphenol A, EO-modified phenyl acrylate, adamantane acrylate, biphenyl acrylate, phenoxyphenyl acrylate, trimethylolpropane acrylate, EO-modified trimethylolpropane triacrylate, pentaerythritol triacrylate, pentaerythritol tetraacrylate, ditrimethylolpropane tetraacrylate, and dipentaerythritol hexaacrylate. These compounds may be used alone, or in the form of a mixture of two or more thereof. In the same way, a methacrylate is usable. In general, acrylates are larger in photopolymerization rate than methacrylates, and thus the formers are preferred.

The cation polymerizable compound may be a compound having in the molecule thereof one or more selected from epoxy, vinyl ether and oxetane groups. Examples of the compound having one or more epoxy groups include 2-ethylhexyl diglycol glycidyl ether, glycidyl ether of biphenyl, any diglycidyl ether of a bisphenol such as bisphenol A, hydrogenated bisphenol A, bisphenol F, bisphenol AD, bisphenol S, tetramethylbisphenol A, tetramethylbisphenol F, tetrachlorobisphenol A, or tetrabromobisphenol A; any polyglycidyl ether of a novolak resin such as phenol novolak, cresol novolak, brominated phenol novolak, or o-cresol novolak; any diglycidyl ether of an alkylene glycol such as ethylene glycol, polyethylene glycol, polypropylene glycol, butanediol, 1,6-hexanediol, neopentyl glycol, trimethylolpropane, 1,4-cyclohexanedimethanol, an EO adduct of bisphenol A, or a PO adduct of bisphenol A; and glycidyl esters such as a glycidyl ester of hexahydrophthalic acid and a diglycidyl ester of dimer acid.

Additional examples of the compound having one or more epoxy groups include alicyclic epoxy compounds such as 3,4-epoxycyclohexylmethyl-3',4'-epoxycyclohexanecarboxylate, 2-(3,4-epoxycyclohexyl-5,5-spiro-3,4-epoxy)cyclohexane-meta-dioxane, di(3,4-epoxycyclohexylmethyl) adipate, di(3,4-epoxy-6-methylcyclohexylmethyl) adipate, 3,4-epoxy-6-methylcyclohexyl-3',4'-epoxy-6'-methyl cyclohexanecarboxylate, methylenebis(3,4-epoxycyclohexane), dicyclopentadiene diepoxide, di(3,4-epoxycyclohexylmethyl)ether of ethylene glycol, ethylenebis(3,4-epoxycyclohexanecarboxylate), lactone-modified 3,4-epoxycyclohexylmethyl-3',4'-epoxycyclohexanecarboxylate, tetra(3,4-epoxycyclohexylmethyl) butanetetracarboxylate, and di(3,4-epoxycyclohexylmethyl)-4,5-epoxytetrahydrophthalate. However, the compound is not limited to these examples.

Examples of the compound having one or more vinyl ethers include diethylene glycol divinyl ether, triethylene glycol divinyl ether, butanediol divinyl ether, hexanediol divinyl ether, cyclohexanedimethanol divinyl ether, hydroxybutyl vinyl ether, ethyl vinyl ether, dodecyl vinyl ether, trimethylolpropane trivinyl ether, and propenyl ether propylene carbonate. However, the compound is not limited to these examples. The vinyl ether compound is generally a cation polymerizable. However, when combined with an acrylate, the vinyl ether compound is radical-polymerizable.

Examples of the compound having one or more oxetane groups include 1,4-bis[(3-ethyl-3-oxetanylmethoxy)methyl] benzene, and 3-ethyl-3-(hydroxymethyl)-oxetane.

These cation polymerizable compounds may be used alone or in the form of a mixture of two or more thereof. The above-mentioned photopolymerizable compound is not limited to these compounds. A fluorine atom (F) may be introduced into the photopolymerizable compound to make the compound low in refractive index to generate a sufficient refractive index difference (in the anisotropic optical film). In order to make the compound high in refractive index, a sulfur atom (S), a bromine atom (Br) or a metal atom that may be of various types may be introduced thereinto.

(Thermoplastic Resin)

Examples of the thermoplastic resin include polyester, polyether, polyurethane, polyamide, polyepoxide, polystyrene, polycarbonate, polyacetal, polyvinyl alcohol, polyvinyl acetate, polyvinyl butyral, and acrylic resin; and copolymers and modified products thereof. When the thermoplastic resin is used, the thermoplastic resin is dissolved into a solvent in which the resin is soluble and then the solution is coated and dried. After the drying, the photocurable compound is then cured by ultraviolet rays to form an anisotropic optical film.

It is sufficient for the solvent to be a solvent in which the thermoplastic resin is soluble. Examples thereof include alcohols such as ethanol, isopropanol, and butanol; ketones such as acetone; esters such as ethyl acetate; ethers such as tetrahydrofuran; and aliphatic, aromatic and halogenated hydrocarbons such as hexane, benzene, toluene, and chloroform.

(Thermoset Resin)

Examples of the thermoset resin include epoxy resin, phenolic resin, melamine resin, urea resin, and unsaturated polyester; and copolymers and modified products thereof. When the thermoset resin is used, the photocurable compound is cured with ultraviolet rays and then the resultant is appropriately heated to cure the thermoset resin, thereby forming an anisotropic optical film.

(Photoinitiator)

Examples of the photoinitiator capable of polymerizing the radical polymerizable compound include benzophenone, benzil, Michler's ketones, 2-chloro thioxanthone, 2,4-diethylthioxanthone, benzoin ethyl ether, benzoin isopropyl ether, benzoin isobutyl ether, 2,2-diethoxyacetophenone, benzyldimethyl ketal, 2,2-dimethoxy-1,2-diphenylethane-1-one, 2-hydroxy-2-methyl-1-phenylpropane-1-one, 1-hydroxycyclohexyl phenyl ketone, 2-methy-1-[4-(methylthio) phenyl]-2-morpholinopropanone-1,1-[4-(2-hydroxyethoxy)-phenyl]-2-hydroxy-2-methyl-1-propane-1-one, bis(cyclopentadienyl)-bis(2,6-difluoro-3-(pyl-1-yl) thitanium, 2-benzyl-2-dimethylamino-1-(4-morpholinophenyl)-butanone-1, and 2,4,6-trimethylbenzoyldiphenylphosphine oxide. These compounds may be used alone or in the form of a mixture of two or more thereof.

The photoinitiator for the cation polymerizable compound is a compound which generates an acid by irradiation with light to make the cation polymerizable compound polymerizable by effect of the generated acid. In general, the compound is preferably an onium salt or a metallocene complex. The onium salt is, for example, a diazonium salt, sulfonium salt, iodonium salt, phosphonium salt or selenium salt. As a counter ion of such a salt, for example, the following anion is used: $BF_4^-$, $PF_6^-$, $AsF_6^-$ or $SbF_6^-$. Specific examples of the photoinitiator include 4-chlorobenzenediazonium hexafluorophosphate, triphenylsulfonium hexafluoroantimonate, triphenyisulfonium hexafluorophosphate, (4-phenylthiophenyl)diphenylsulfonium hexafluoroantimonate, (4-phenylthiophenyl)diphenylsulfonium hexafluorophosphate, bis[4-(diphenylsulfonio)phenyl]sulfide-bis-hexafluoroantimonate, bis[4-(diphenylsulfonio)phenyl]sulfide-bis-hexafluorophosphate, (4-methoxyphenyl)diphenylsulfonium hexafluoroantimonate, (4-methoxyphenyl)phenyliodonium hexafluoroantimonate, bis(4-t-butylphenyl)iodonium hexafluorophosphate, benzyltriphenylphosphoium hexafluoroantimonate, triphenylselenium hexafluorophosphate, (η5-isopropylbenzene) (η5-cyclopentadienyl) iron (II) hexafluorophosphate. However, the photoinitiater is not limited to these compounds. These compounds may be used alone or in the form of a mixture of two or more thereof.

(Functional Additive)

It is preferred to incorporate a functional additive into the anisotropic optical film to give a color change improving effect thereto. Examples of the functional additive include (a) a condensed silane compound, (b) superfine particles each having a modified surface, and (c) a softener.

(a) Condensed Silane Compound

A silane is a compound having 1, 2, 3 or 4 hydrolyzable groups, preferably 2 or 3 hydrolyzable groups, or a mixture of such compounds. Examples of the hydrolyzable groups include hydrogen, halogens such as F, Cl, Br and I; alkoxy, preferably C1 to C6 alkoxy such as methoxy, ethoxy, n-propoxy, i-propoxy and butoxy; aryloxy, preferably C6 to 10 aryloxy such as phenoxy; acyloxy such as acetoxy and propionyloxy; alkylcarbonyl, preferably C2 to 7 alkylcarbonyl such as acetyl; and amino, preferably monoalkylamino or dialkylamino each having, in alkyl thereof, 1 to 12 carbon atoms, in particular, 1 to 6 carbon atoms.

Particularly preferred examples of the silane include methacryloxypropyltrimethoxysilane, acryloxypropyltrimethoxysilane, dimethyldimethoxysilane, dimethyldiethoxysilane, 3-glycidyloxy-propyltrimethoxysilane, glycidyloxy-propyltriethoxysilane, vinyltriethoxysilane, and methyltriethoxysilane.

The silane can be partially condensed by using a hydrolyzing agent such as water, an aqueous HCl solution, an aqueous $HNO_3$ solution or ammonia water in an insufficient-equivalent amount, for example, in an amount of 3/10 to 9/10 of the chemical stoichiometric amount. The silane may be completely condensed. In this case, it is preferred to set the proportion of the hydrolyzing agent to give an inorganic condensation proportion of 33 to 100%. An average inorganic condensation proportion of 33% means that, for example, approximately one third of hydrolyzable residues of silanes are condensed to form crosslinked bonds of —Si—O—Si—. At a condensation proportion of 100%, all hydrolyzable residues of any molecule of the silane are condensed. The condensation through the hydrolyzing agent is conducted at a temperature ranging preferably from 5 to 40° C.

The condensation of the silane may be conducted by a polymerizing method using UV radiation.

The organic conversion proportion of the silane is preferably from 0 to 95%, more preferably from 5 to 60%. The organic conversion proportion denotes the degree of an addition polymerization reaction of C=C double bonds or epoxy groups present in its side chains. An organic conversion proportion of 95% means that, for example, 95% of all the C=C bonds or epoxy groups have reacted. In the case of the C=C double bonds, for example, acrylate residues, the organic conversion proportion is measurable by a decrease in the quantity of a C=C vibration band in an infrared spectrum thereof. The addition polymerization is induced by an ordinary method, for example, acid or base hydrolysis in the case of the epoxy groups, or, for example, UV radiation in the case of the C=C double bonds.

The superfine particles, which will be detailed later, may be produced by hydrolyzing and condensing a precursor (preferably an alkoxide) by condensing an organic silane partially and beforehand.

The mix proportion of the condensed silane compound is preferably set to 0.00120% by mass of all solids in the anisotropic optical film.

(b) Surface-Modified Superfine Particles

The surface-modified superfine particles preferably contain an oxide, such as ZnO, CdO, $SiO_2$, $TiO_2$, $ZrO_2$, $CeO_2$, $SnO_2$, $Al_2O_3$, $In_2O_3$, $La_2O_3$, $Fe_2O_3$, $Ta_2O_5$, $Cu_2O$, $V_2O_5$, $MoO_3$ and $WO_3$, and a halide, such as AgCl, AgBr, AgI, CuI, CuBr, $CdI_2$, and $PbI_2$. Groups of the surfaces thereof may be organic polymerizable and/or condensation-polymerizable groups that are sensitive to radical, cation or anion, thermally or optically chemical polymerization, or thermally or optically chemical condensation polymerization. In the present invention, preferred is a surface group having a (meth) acrylic, ally, vinyl or epoxy group. Of these groups, (meth) acrylic and epoxy groups are particularly preferred.

Condensation polymerizable groups concerned mainly therewith are hydroxy, carboxyl and amino groups, which are used to give ether, ester and amide bonds, respectively, between the nanoscale particles and between the silane molecules.

In a method for yielding the surface-modified superfine particles, it is advisable to cause superfine particles to react with a compound containing a polymerizable group, for example, an unsaturated carboxylic acid, in particular, methacrylic acid or acrylic acid, and acrylosilane and/or unsaturated β diketone.

The organic group(s) present on the surfaces of the superfine particles and containing a polymerizable and/or condensation polymerizable group (each) preferably has/have a molecular weight less than 300, in particular, less than 200.

As described in, for example, German Patent DE-A-19719948, all ordinary production methods are suitable for producing the surface-modified nanoparticles.

The superfine particles preferably have a diameter (primary particle size) of 100 nm or less, in particular, 50 nm or less. The lower limit thereof is not particularly limited. For reasons for practical use, the lower limit is generally 0.5 nm, in particular 1 nm, frequently 4 nm.

In a method for modifying the superfine particle surfaces, for example, the superfine particle surfaces are initially caused to react with a compound containing a polymerizable group, for example, an unsaturated carboxylic acid, in particular, methacrylic acid, acrylic acid, and acrylosilane and/or an unsaturated β diketone so that the modification can be attained.

The mix proportion of the surface-modified superfine particles is preferably from 0.01 to 20% by mass of all solids in the anisotropic optical film.

(c) Softener

For the softener, all of the following are suitable as a general rule: compounds having an elastic or softening property in accordance with DIN 55945 (December 1988). Mainly, ester type compounds are suitable therefor. A plasticizer selected from the following group is preferred: acyclic aliphatic dicarboxylates, for example, adipates such as di-n-octyl adipate, bis-(2-ethylhexyl) adipate, and diisodecyl adipate; dibutyl sebacate, dioctyl sebacate, and bis-(2-ethylhexyl) sebacate; esters each made from a C6 to C12 dicarboxylic acid and a polyalkylene glycol, for example, triethylene glycol bis-(n-heptanoate), triethylene glycol bis-(2-ethylhexanoate), and triethylene glycol bis-(isononanoate); esters each made from a C6 to C12 dicarboxylic acid and a polyalkylene glycol, for example, triethylene glycol bis-(2-ethylbutyrate); and diesters each made from (meth)acrylic acid and a polyalkylene glycol such as polypropylene glycol diacrylate or dimethacrylate, or polyethylene glycol diacrylate or dimethacrylate, for example, tetraethylene glycol di(meth)acrylate.

The mix proportion of the softener is preferably from 0.1 to 20% of all solids in the anisotropic optical film.

Raw Material (Mix Proportion of Each Component Thereof, and Other Optional Components) of Anisotropic Optical Film In the present invention, the above-mentioned photoinitiator is blended, into 100 parts by mass of the photocurable compound, in an amount from about 0.01 to 10 parts by mass, preferably from about 0.1 to 7 parts by mass, more preferably from about 0.1 to 5 parts by mass. If the amount is less than 0.01 part by mass, the photocuring performance is lowered. If the amount is more than 10 parts by mass, the resin is cured only at the outer surface thereof so that the inside is lowered in curability. Additionally, the anisotropy is lowered and further the formation of tabular structures is hindered. The photoinitiator is usually used in the state that a powder thereof is directly dissolved in a mixture of the above-mentioned composition. However, when the photoinitiator is poor in solubility, a product is usable in which the photoinitiator is beforehand dissolved into a very slight amount of a solvent to have a high concentration. This solvent is more preferably photopolymerizable. Specific examples thereof include propylene carbonate, and γ-butyrolactone. In order to improve photopolymerizing performance, a known dye or sensitizer that may be of various types may be added thereto. Together with the photoinitiator, a thermosetting initiator is usable which is capable of setting or curing the photopolymerizable compound through heating. In this case, it is expectable that the heating after the photocuring further promotes the polymerization and curing of the photopolymerizable compound to be completed.

The thermosetting initiator is preferably an organic peroxide in the form of a diacyl peroxide, peroxydicarbonate, alkyl perester, peroxydialkyl, perketal, peroxy ketone, or alkylhydro peroxide. Examples of the thermosetting initiator include peroxydibenzoyl, t-butyl perbenzoate, and azobisisobutyronitrile. An example of the initiator that is a cation thermoinitiator is 1-methylimidazole. It is sufficient for the thermosetting initiator to be incorporated into an amount of 0.01 to 20 parts by mass for 100 parts by mass of the thermoset resin.

In the present invention, the photocurable compound is cured to form an anisotropic optical film. About each of the components of the raw material constituting the anisotropic optical film, two or more species thereof may be mixed with each other. As required, known additives may be added to the composition. Examples thereof include a plasticizer, an antioxidant, a light stabilizer, a surfactant, and a leveling agent. Particularly effective are a plasticizer, a surfactant, a leveling agent plasticizer and others in order to improve the composition in film-formability and other properties. Examples thereof include plasticizers such as polyester phthalates, polyester adipates, and silicone and acrylic leveling agents. The addition proportion thereof is preferably from 0.5 to 10% by weight of the whole of the composition.

The ratio by mass of the photocurable compound that has a silicon skeleton to the compound that has no silicone skeleton ranges preferably from 15:85 to 85 to 15, more preferably from 30:70 to 70:30. When the ratio is set into the range, phase separation between low-refractive-index regions and high-refractive-index regions advances easily (in the workpiece of the anisotropic optical film). If the proportion of the photocurable compound that has a silicon skeleton is less than the lower limit value or more than the upper limit value, the phase separation does not advance easily so that a problem that the anisotropic optical film is short in anisotropy is not easily solved. It is preferred to set, into the range of 10 to 60% by mass of the whole of the photocurable resin composition, the mix proportion of at least one compound selected from compounds each having a cardo structure, compounds each having in a single molecule thereof two or more aromatic rings, cyclic hydrocarbon compounds each having a crosslinked structure, and spiro compounds. If the addition proportion is less than the lower limit value, the effect of disturbing the orientation of molecules is lost so that an effect of lowering the film in retardation is not desired. If the addition proportion is too large, the orientation is excessively disturbed to damage the original optical anisotropy. The mix proportion is more preferably from 15 to 45% by mass. In this case, a sufficient decline in the retardation can be expressed. By selecting these compounds and the mix proportions thereof appropriately, the anisotropic optical film in the present invention can realize compatibility between anisotropy and low retardation, which has not been attained in the prior art. The retardation can be adjusted to a sufficient low value of 25 nm or less. Furthermore, the retardation can be set to 10 nm or less. The retardation can be adjusted to a retardation equivalent to that of a TAC film, COP film or polycarbonate film (PC) sheet, which has been used as a retardation film in the prior art. The anisotropic optical film in the invention can be rendered an alternative for these matters. In other words, the anisotropic optical film in the invention is usable as a protective film for a polarizing plate. As described above, the anisotropic optical film yielded in the invention is low in retardation. Accordingly, even when the film is present between crossed nicols of polarizing plates, light leakage is scarcely generated. Even when the film is present between parallel nicols of polarizing plates, light loss is scarcely generated. Thus, when the film is used in, for example, a display, the film contributes to a restraint of a decline of the resultant image in luminance, and an improvement thereof in contrast.

[Process]

The following will describe a method (process) for producing an anisotropic optical film in the present invention.

The above-mentioned material (photocurable resin composition) for forming an anisotropic optical film is initially painted onto an appropriate substrate such as a transparent polyethylene terephthalate (PET) film to form a coating layer. As required, the coating layer is dried to vaporize the solvent. The dry thickness thereof is from 10 to 500 μm, more preferably from 20 to 200 μm, even more preferably from 30 to 100 μm. If the dry thickness is less than 10 μm, the light diffusing property obtained through an UV radiation process that will be detailed later is unfavorably poor. Conversely, if the dry thickness is more than 500 μm, the resultant film is excessively intense in diffusing property as a whole, not to gain easily an anisotropy which is a characteristic of the present invention. In addition, unfavorably, cost increases and the film is unsuitable for articles required to be made thinner. Furthermore, a release film, or a mask is laminated onto this coating layer to produce a photosensitive laminate.

(Method for Forming the Photocurable Resin Composition into a Sheet Form onto a Substrate)

The method for forming the photocurable-compound-containing photocurable resin composition into a sheet form onto a substrate may be an ordinary painting method or printing method. Specifically, the method may be, for example, a coating such as airdoctor coating, bar coating, blade coating, knife coating, reverse-roll coating, transfer roll coating, gravure roll coating, kiss coating, cast coating, spray coating, slot orifice coating, calender coating, dam coating, dip coating, or die coating; an intaglio printing such as gravure printing; a stencil printing such as screen printing; or some other printing. When the photocurable resin composition is low in viscosity, it is allowable to arrange a weir having a predetermined height on the circumference of the substrate, and cast the photocurable resin composition into a space surrounded by the weir.

(Light Source)

The light source for radiating light rays to the coating film is usually an ultraviolet-generating short-arc light source. The light source may be specifically, for example, a high-pressure mercury lamp, a low-pressure mercury lamp, a metal halide lamp, or a xenon lamp. The light rays to be radiated to the photocurable-compound-containing composition need to contain a wavelength capable of curing the photocurable compound. The light rays are usually light rays having a central wavelength of 365 nm, which is the wavelength of a mercury lamp.

The form of the light source is preferably a linear form or spot form. A light source may be used which looks substantially linear when viewed from a position to be irradiated to light. It is preferred to use a linear light source when tabular structures are formed in the anisotropic optical film, and use a spot light source when columnar structures are formed therein. When both of tabular structures and columnar structures are formed in the anisotropic optical film, it is advisable to use a linear light source and a spot light source.

The method for gaining the linear rays may be an already-known method using a light and a lens that may be of various types. In the present invention, as a simple and easy method, the following example is described: an example using a light source in which a diffusion light source is converted through, for example, a Fresnel lens into parallel rays and further the parallel rays are converted through a lenticular lens to linear rays diffused only in one direction. However, the linear-ray-gaining method is not limited to this method.

In order to produce parallel rays from the short-arc UV light source, for example, a reflecting mirror is arranged in the rear of the light source to emit light rays from the light source as a point light source into a predetermined direction. Furthermore, the light rays can be passed through a Fresnel lens to be rendered the parallel rays. The Fresnel lens is a lens in which an ordinary lens is divided into concentric regions to be decreased in thickness. The lens has a saw-form cross section. When the light rays emitted out from the spot light source pass through the Fresnel lens, various directions of the light rays are unified into a single direction so that the light rays turn to the parallel rays. However, it is not necessarily essential to use any Fresnel lens in order to obtain the emitted UV parallel rays necessary for producing the anisotropic optical film in the present invention. Thus, various methods, an example of which is a laser, are usable.

The parallel rays are radiated to a flat surface of a lenticular lens to be emitted from an irregularity surface of this lens. In this way, the parallel rays are partially converted to linear rays. In other words, by aid of the lenticular lens, not only the parallel rays but also linear rays can be obtained.

The UV radiating method using the lenticular lens is one method for producing the anisotropic optical film in the present invention. In the invention, the film-producing method is not limited to this method. In short, to form specified internal structures in a layer of the photocurable composition, it is important to radiate UV rays as spread in a planar fan form to the photosensitive laminate.

In other words, fine structures having high and low refractive indexes according to the present invention are formed through the step of radiating light rays spread in a planar fan form to the photocurable composition layer. The radiated light rays have a wavelength capable of curing the photocurable composition. In the light-radiating step, it is preferred to use light rays obtained by diffusing parallel rays into a planar fan form.

In the production of the anisotropic optical film in the present invention, the illuminance of the UV rays radiated to the coating layer ranges preferably from 0.01 to 100 mW/cm$^2$, more preferably from 0.1 to 20 mW/cm$^2$. If the illuminance is 0.01 mW/cm$^2$ or less, a long time is required for the curing so that the anisotropic optical film is deteriorated in production efficiency. If the illuminance is 100 mW/cm$^2$ or more, the photocurable compound is cured too rapidly to form the structures. Thus, the film cannot express a target anisotropic diffusing property.

The period when the UV rays are radiated is not particularly limited, and is from 10 to 180 seconds, more preferably from 30 to 120 seconds. Thereafter, the release film is peeled off, so that the anisotropic optical film in the present invention can be yielded.

As described above, the anisotropic optical film in the present invention is a film obtained by radiating low-illuminance UV rays to the photocurable composition for a relatively long period, thereby forming the specific internal structures in this composition. Thus, only by such a UV radiation, an unreacted fraction of the monomer component(s) may remain so that the resultant film may be sticky and have a problem about handleability or endurance. In such a case, an additional radiation of UV rays having a high illuminance of 1000 mW/cm$^2$ or more makes it possible to polymerize the remaining monomer fraction. At this time, the UV rays are radiated preferably from a side (substrate side) of the film that is reverse to the previously-UV-radiated side thereof.

Display Apparatus

A display apparatus having the display device and the anisotropic optical film which constitute the present invention is applicable to display apparatuses such as a liquid crystal display (LCD), a plasma display panel (PDP), an electroluminescence display (ELD), a cathode-ray tube display (CRT), a surface electric field display (SED), and an electronic paper. The anisotropic optical film in the invention can be preferably used in transmissible, reflective and semi-transmissible liquid crystal display apparatuses, and top emission type or bottom emission type organic ELs. This is because in these display apparatuses, the problem of the color shift is easily caused. In liquid crystal display apparatuses, light rays are twisted through their liquid crystal, so that a color shift is caused. About the organic ELs, the color shift problem is easily caused, particularly, in the bottom emission type ELs. This is because the ELs make use of reflected light.

The anisotropic optical film in the present invention can be used by bonding to a desired position through an adhesive layer or viscous layer causing few problems about adhesive strength.

EXAMPLES

In accordance with methods described below, anisotropic optical films that each constituting the present invention, and anisotropic optical films of comparative examples were produced.

Example 1

A dispenser was used to form a partition wall of 0.2 mm height on a PET film (trade name: A4300, manufactured by Toyobo Co., Ltd.) 100 μm in thickness and 76×26 mm in size, and along the whole of a peripheral edge portion thereof. A photocurable resin composition described below was filled into the inside of the wall, and then the resultant was covered with another PET film.

Silicone/urethane/acrylate (refractive index: 1.460): 65 parts by weight
    (trade name: 00-225/TM18, manufactured by Rahn AG; weight-average molecular weight: 5,890)
    EO adduct diacrylate of bisphenol A (refractive index: 1.536): 35 parts by weight (trade name: Ebecryl 150, manufactured by Daicel-Cytec Co., Ltd.))

2,2-Dimethoxy-1,2-diphenylethane-1-one: 4 parts by weight
(trade name: Irgacure 651, manufactured by the company BASF)

Ultraviolet rays were radiated to this liquid membrane 0.1 mm in thickness, both surfaces of which were sandwiched between the respective PET films, at an angle of 60° from the normal direction of the liquid membrane, and at an irradiation intensity of 10 mW/cm$^2$ for 1 minute. The ultraviolet rays were rays obtained by converting parallel rays radiated out from a radiating unit, for downward radiation, of a UV spot light source (trade name: L2859-01, manufactured by Hamamatsu Photonics K.K.) to linear rays through a lenticular lens. Through the process, an anisotropic optical film of Example 1 was yielded which had many fine linear regions as illustrated in FIG. 6 (however, this example was different in scattering central axis from that in FIG. 6). From this workpiece, the PET films were peeled to yield an anisotropic optical film in the present invention.

Example 2

An anisotropic optical film in the present invention was yielded in the same way as in Example 1 except that a change was made to radiate the ultraviolet rays at an angle of 45° from the normal direction of the liquid membrane.

Example 3

An anisotropic optical film in the present invention was yielded in the same way as in Example 1 except that changes were made to set the thickness of the liquid membrane to 0.05 mm, and radiate the ultraviolet rays at an angle of 45° from the normal direction of the liquid membrane.

Comparative Example 1

A commercially available isotropic diffusion film of a fine-particle-dispersed type was prepared without producing any anisotropic optical film constituting the present invention. The total thickness of the prepared isotropic diffusion film was 120 μm. The haze was 80% and the total transmittance was 85%.

Comparative Example 2

A commercially available clear hard coat film was prepared without producing any anisotropic optical film constituting the present invention. The total thickness of the prepared clear hard coat film was 90 μm. The haze was 2% and the total transmittance was 92%.

The weight-average molecular weight (Mw) of the silicone/urethane/acrylate used in Examples 1 to 3 and Comparative Examples 1 and 2 was measured, as the molecular weight in terms of polystyrene, using a GPC method under conditions described below.

Degasser: DG-980-51 (manufactured by JASCO Corp.)
Pump: PU-980-51 (manufactured by JASCO Corp.)
Auto-sampler: AS-950 (manufactured by JASCO Corp.)
Thermostat: C-965 (manufactured by JASCO Corp.)
Columns: Two columns Shodex KF-806L (manufactured by Showa Denko K.K.)
Detector: RI (SHIMAMURA YDR-880)
Temperature: 40° C.
Eluent: THF
Injected amount: 150 μl
Flow rate: 1.0 ml/min
Sample concentration: 0.2%

(Evaluations According to SEM and EDS)

About SEM and EDS, photographs were taken under conditions described below.

SEM

Observations were made about the state of a cross section of the anisotropic optical film yielded in Example 1, and data on elements contained therein according to SEM and EDS. The observations were made after carbon was vapor-deposited onto the front surface of the anisotropic optical film. The following is the condition for the SEM and EDS observations.

Analyzer: JSM-6460LV (manufactured by JEOL Ltd.)/INCA (manufactured by a company, Oxford)
Pretreatment machine: SC-701C (manufactured by Sanyu Electron Co., Ltd.) for C (carbon) coating: 45 nm
SEM conditions:
Acceleration voltage: 15 KV
Applied current: 0.15 nA
Vacuum degree: high vacuum
Image Detector: reflective electron detector
Sample inclination: 0 degree (Anisotropy Evaluation of Anisotropic Optical Films)

The anisotropic optical film of each of the working examples and the comparative examples was evaluated, using an angle-variable goniophotometer (manufactured by Genesia Corp.), in which a floodlighting angle of a light source and a light receiving angle of a light receiving unit are variable at will. Its light receiving portion was fixed at a position where straight-going light from the light source was receivable. Into a sample holder positioned therebetween, the anisotropic optical film obtained in each of the working examples and the comparative examples was set. As illustrated in FIG. 8, the sample was rotated around a rotary axis (L) to measure the linear transmitted light quantity of the sample, correspondingly to each incident angle of the light. According to this evaluating method, an estimation can be made as to what angle range permits the incident light to diffuse. In short, the anisotropy of the diffusion can be known. This rotary axis (L) is an axis equivalent to the axis B-B in the sample structure illustrated in FIG. 6($a$). The measurement of the linear transmitted light quantity was made about wavelengths in the visible ray range, using a luminous efficacy filter.

(Evaluations of LCDs about Viewing Angle Thereto)

The film prepared in each of the working examples and the comparative examples was caused to adhere closely to the front surface of an upper polarizing plate of a TN type liquid crystal display device through a transparent viscous agent, and then the resultant was evaluated about viewer's viewing angle thereto. In the anisotropic optical film of each of the working examples, the viewing angle to be measured was made equal to a direction having a scattering central axis showing an intense diffusion. The film of each of the comparative examples was isotropic, and thus the direction of the film was selected at will; however, the viewing angle direction to the display device was made identical with that in the case of the working examples. A direction in which a minimum color change was exhibited in the liquid crystal display device was zero degree.

In the evaluation, each of the films that was bonded to the polarizing plate was measured about the luminance (L*) and the color number (a*, b*) thereof at respective viewing angles of 0 and 60 degrees to the panel. These were calculated under condition that the luminance when the viewing angle was 0 degree was represented by L*, the difference in luminance between 0 degree and 60 degrees by ΔL*, and the color difference by ΔE*ab. The results are shown in Table 1.

TABLE 1

| Example | L* | ΔL* | ΔE*ab |
|---|---|---|---|
| Example 1 | 134 | −52 | 53 |
| Example 2 | 127 | −40 | 42 |
| Example 3 | 133 | −23 | 35 |
| Comparative Example 1 | 91 | −69 | 71 |
| Comparative Example 2 | 140 | −73 | 76 |

As shown in Table 1, it is understood that the use of any anisotropic optical film that constitutes the present invention makes an improvement of the film in optical properties dependent on viewer's viewing angle having a scattering central axis. In the working examples, a decline in the value L* is smaller than in Comparative Example 1. As is understood from the evaluation results of the values ΔL* and ΔE*ab, the difference between 0 degree and 60 degrees is decreased in the working examples from the comparative examples, and about both of the luminance (ΔL*) and the color difference (ΔE*ab), an unnatural feel can be relieved when the viewing angle was changed.

INDUSTRIAL APPLICABILITY

As described above, according to the present invention, a display apparatus can be provided which has a sufficient luminance and can further solve a problem about the color change.

The invention claimed is:

1. A display apparatus comprising
a display device showing a color change in accordance with viewer's viewing angle, and
an anisotropic optical film having a diffusing property changed in accordance with the incident angle of light radiated thereinto,
wherein
the anisotropic optical film has at least one scattering central axis, and
an angle made between the scattering central axis and a direction along which the display device shows a minimum color change is from 20 to 65°, or −20 to −65°.

2. A display apparatus comprising
a display device showing a color change in accordance with viewer's viewing angle, and
an anisotropic optical film having a diffusing property changed in accordance with the incident angle of light radiated thereinto,
wherein
the anisotropic optical film has at least two scattering central axes, an angle made between one of the scattering central axes and a direction along which the display device shows a minimum color change is from 20 to 65°, and
an angle made between the other scattering central axis and the direction along which the display device shows the minimum color change is from −20 to −65°.

3. The display apparatus according to claim 1, wherein an angle made between the scattering central axis and the normal direction of an observing surface of the display device ranges from −60 to 60°.

4. The display apparatus according to claim 1, wherein the anisotropic optical film has a tabular region therein.

5. The display apparatus according to claim 1, wherein the display device is a liquid crystal device, a plasma display panel, or an organic EL device.

6. The display apparatus according to claim 5, wherein the liquid crystal display device has: a liquid crystal cell in which a liquid crystal is sandwiched between a pair of substrates; and a polarizer.

7. The display apparatus according to claim 2, wherein an angle made between the at least two scattering central axes and the normal direction of an observing surface of the display device ranges from −60 to 60°.

8. The display apparatus according to claim 2, wherein the anisotropic optical film has a tabular region therein.

9. The display apparatus according to claim 1, wherein the angle made between the scattering central axis and a direction along which the display device shows a minimum color change is from 30 to 55° or from −30 to −55°.

10. The display apparatus according to claim 2, wherein the angle made between one of the scattering central axes and a direction along which the display device shows a minimum color change is from 30 to 55°, and
the angle made between the other scattering central axis and the direction along which the display device shows the minimum color change is from −30 to −55°.

* * * * *